United States Patent
Healy et al.

(10) Patent No.: US 7,720,077 B1
(45) Date of Patent: May 18, 2010

(54) TIMED PACKET PROCESSING TO REGULATE DATA TRANSFER BETWEEN COMPONENTS OF A GATEWAY FOR A CONSTANT DELAY NETWORK

(75) Inventors: Michael Healy, Boxborough, MA (US); Yuen-Wen Lee, San Jose, CA (US); Yihuan Sun, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 12/125,876

(22) Filed: May 22, 2008

(51) Int. Cl.
*H04L 12/28* (2006.01)
(52) U.S. Cl. .................. 370/395.62; 370/401
(58) Field of Classification Search .......... 370/401, 370/402, 389, 304, 324, 350, 395.62, 395.64
See application file for complete search history.

(56) References Cited

U.S. PATENT DOCUMENTS

2008/0209489 A1 * 8/2008 Joyce et al. ............. 725/111

OTHER PUBLICATIONS

Cisco Systems, Inc., "Cisco uMG9850 QAM Module", c. 1992-2004.

* cited by examiner

*Primary Examiner*—Brenda Pham
(74) *Attorney, Agent, or Firm*—Stolowitz Ford Cowger LLP

(57) ABSTRACT

In one embodiment, a gateway for a constant delay network identifies a baseband clock that is synchronized by exchanging synchronization messages over a packet switched network. The gateway then generates a strobe by manipulating the identified baseband clock using a custom multiplier that is selected according to transmission variables. The gateway then signals a front end component to process fixed length packets for transfer to a back end component according to the generated strobe, which can reduce or eliminate buffering by the back end component and can improve cable modem operation.

19 Claims, 3 Drawing Sheets

TIMED PACKET PROCESSING TO REGULATE DATA TRANSFER BETWEEN COMPONENTS OF A GATEWAY FOR A CONSTANT DELAY NETWORK

TECHNICAL FIELD

The present disclosure relates generally to the field of networking.

BACKGROUND

Cable operators have widely deployed high-speed data services on cable television systems. These data services allow subscriber-side devices, such as personal computers, to communicate over a cable network. A Modular Cable Modem Termination System (M-CMTS) connects the cable network to a data network, such as the Internet. A downstream Edge Quadrature Amplitude Modulation (EQAM) located in the cable network receives data transferred from the M-CMTS over a packet switched portion of the network (which can be characterized as having variable transmission delays), performs modulation and other processing, and then transfers the modulated data over a Hybrid Fiber Coaxial (HFC) portion of the cable network, which is specified as a constant transmission delay portion.

Because the variable EQAM receive data rate can sometimes exceed a rate that some or all of the EQAM components are processing packets, multiple components of the EQAM are equipped with relatively large buffers to queue up data to be output. Equipping each of these components with relatively large buffers prevents the further reduction in cost to manufacture the EQAM. Also, processing the buffered data can produce delays that can be sufficient to disrupt operation of the cable modems. The disclosure that follows solves this and other problems.

DESCRIPTION OF EXAMPLE EMBODIMENTS

Overview

Figure 1:
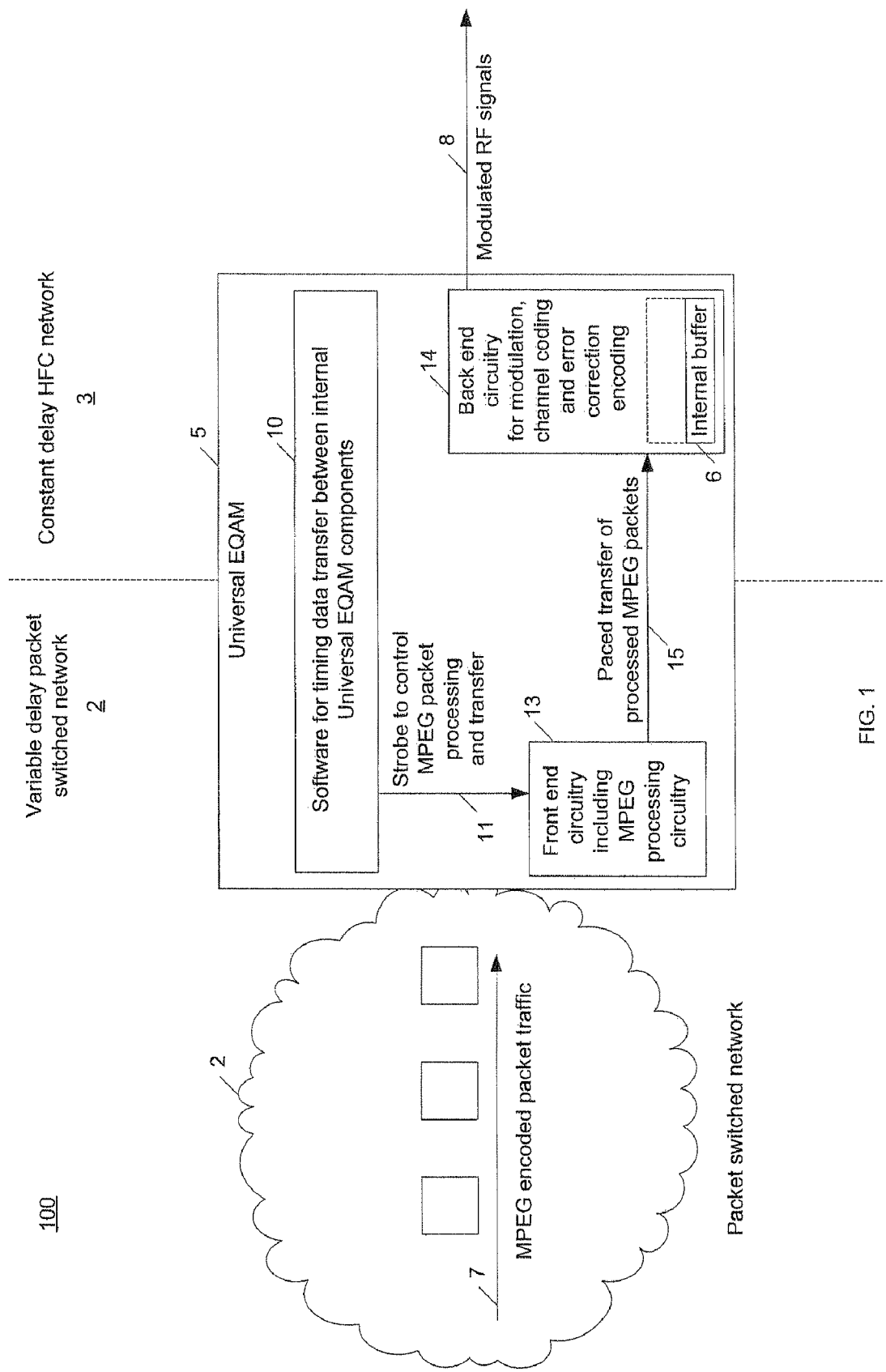
FIG. 1 illustrates an example system including a Universal Edge Quadrature Amplitude Modulation (EQAM) having improved packet processing that can reduce buffering costs and improve cable modem operation.

In one embodiment, a gateway for a constant delay network identifies a baseband clock that is synchronized by exchanging synchronization messages over a packet switched network. The gateway then generates a strobe by manipulating the identified baseband clock using a custom multiplier that is selected according to transmission variables. The gateway then signals a front end component to process fixed length packets for transfer to a back end component according to the generated strobe, which can reduce or eliminate buffering by the back end component and can improve cable modem operation.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown may be conventional and known in the art.

FIG. 1 illustrates an example system including a Universal Edge Quadrature Amplitude Modulation (EQAM) having improved packet processing that can reduce buffering costs and improve cable modem operation.

The system 100 includes a Universal EQAM 5 that operates as a gateway between the packet switched network 2 and the Hybrid Fiber Coaxial (HFC) network 3, which is specified as a constant transmission delay network. The EQAM 5 is a downstream EQAM, receiving communications over network 2 from a Modular Cable Modem Termination System (M-CMTS) and sending communications downstream over the HFC network 3 to cable modems. The EQAM 5 is a "Universal" EQAM, which means that it can process Data Over Cable Interface Specification (DOCSIS) data as well as Traditional-Video data.

The Universal EQAM 5 includes software 10 for timing packet processing by front end circuitry 13, which in turn paces data transfer from front end circuitry 13 to back end circuitry 14. The software 10 generates the strobe 11 to cause the circuitry 13 to process and send an MPEG packet to the circuitry 14 at an interval selected by the software 10. The software 10 selects the interval to produce an input data rate into the circuitry 14 that corresponds to an output data rate associated with the modulated Radio Frequency (RF) signals 8, which can eliminate an enormous amount of buffering and greatly reduce the flow-control/packet-processing complexity. The selected interval is customized based on transmission variables for the corresponding modulated stream. The operation of the software 10 will be described later in greater detail with reference to FIG. 2.

Referring still to FIG. 1, advantages can be realized from the timed processing and paced transfer 15 of the MPEG packets as compared to conventional EQAMs that process MPEG packets independently of a strobe signal. Namely, the timed transfer 15 prevents certain types of disruption to operation of downstream cable modems. The next two paragraphs briefly explain how this timed transfer 15 can prevent disruption to cable modem operation.

One of the functions of the MPEG processing circuitry 13 is to replace DOCSIS timestamps included in the traffic 7 by the M-CMTS core with new values. Thereafter, a cable modem receiving a representation of the "restamped" traffic uses these timestamps for various purposes. When using these values, the cable modem assumes a constant transmission delay attributable to the transmission path that extends from the point of the "restamping" to the decode point (namely from the front end circuitry 13 to the downstream cable modems). This data path extends from front end circuitry 13, through the back end circuitry 15, and from the Universal EQAM 5 over the Hybrid-Fiber-Coax (HFC) network (not shown), and finally terminating on a cable modem (not shown).

Although the delay attributable to transmission over the HFC network 3 is constant, in conventional EQAMs the delay between "restamping" the MPEG packets and data modulation is relatively variable. Specifically, the received packet switched traffic rate can vary due to changing network conditions of the packet switched network, which affects a packet processing rate of an input stage of the EQAM. For example, if the received packet rate increases due to a relief from network congestion, there can be a corresponding period where the input stage "restamps" and transfers MPEG packets to the output stage at a rate that is greater than a rate that the output stage can encode and modulate the MPEG packets. Even if the internal buffers for the output stage do not overflow due to this faster rate, the delay between the cable modem receiving those buffered packets and earlier packets that were immediately modulated and not buffered will be different (variable delay which is attributed to the buffer queue build-up), which can disrupt operation of the cable modem. In contrast, the Universal EQAM 5 can provide a constant transmission delay between the instant the MPEG packets 7 are timestamped by the circuitry 13 and the instant that the corresponding signal 8 is output from the Universal EQAM 5.

The timed processing and transfer by the circuitry 13 according to the strobe signal 11 can also reduce manufacturing costs as compared to conventional EQAMs. Namely, the internal buffer for components downstream from the "re-stamping" circuitry 13 can be reduced or eliminated due to the paced transfer 15. For example, the internal buffer 6 of the circuitry 14 can be smaller due to the calculated strobe transfer 15 controlled by the software 10. It may even be possible to eliminate the buffer 6 completely. Other components that are upstream from the "re-stamping" circuitry may utilize Dynamic Random Access Memory (DRAM) or other memory that is generally less expensive than internal buffers 6. For example, the Universal EQAM 5 may use DRAM to store received MPEG packets 7 waiting to be processed according to the strobe signal 11.

Although the system 100 includes a Universal EQAM 5, it should be understood that the principles described herein can also be applied to Traditional-Video EQAMs. Although the system 100 is a DOCSIS cable network system, it should be apparent that the principles described herein can be applied to any gateway between a packet switched network and a constant transmission delay network. Also, although the system 100 communicates MPEG packets, it should be apparent that the principles described herein can be applied to other fixed length packet protocols.

It should be apparent that the principles described above can be implemented using any type of controller. For example, logic may be used to implement the principles described above.

Figure 2:
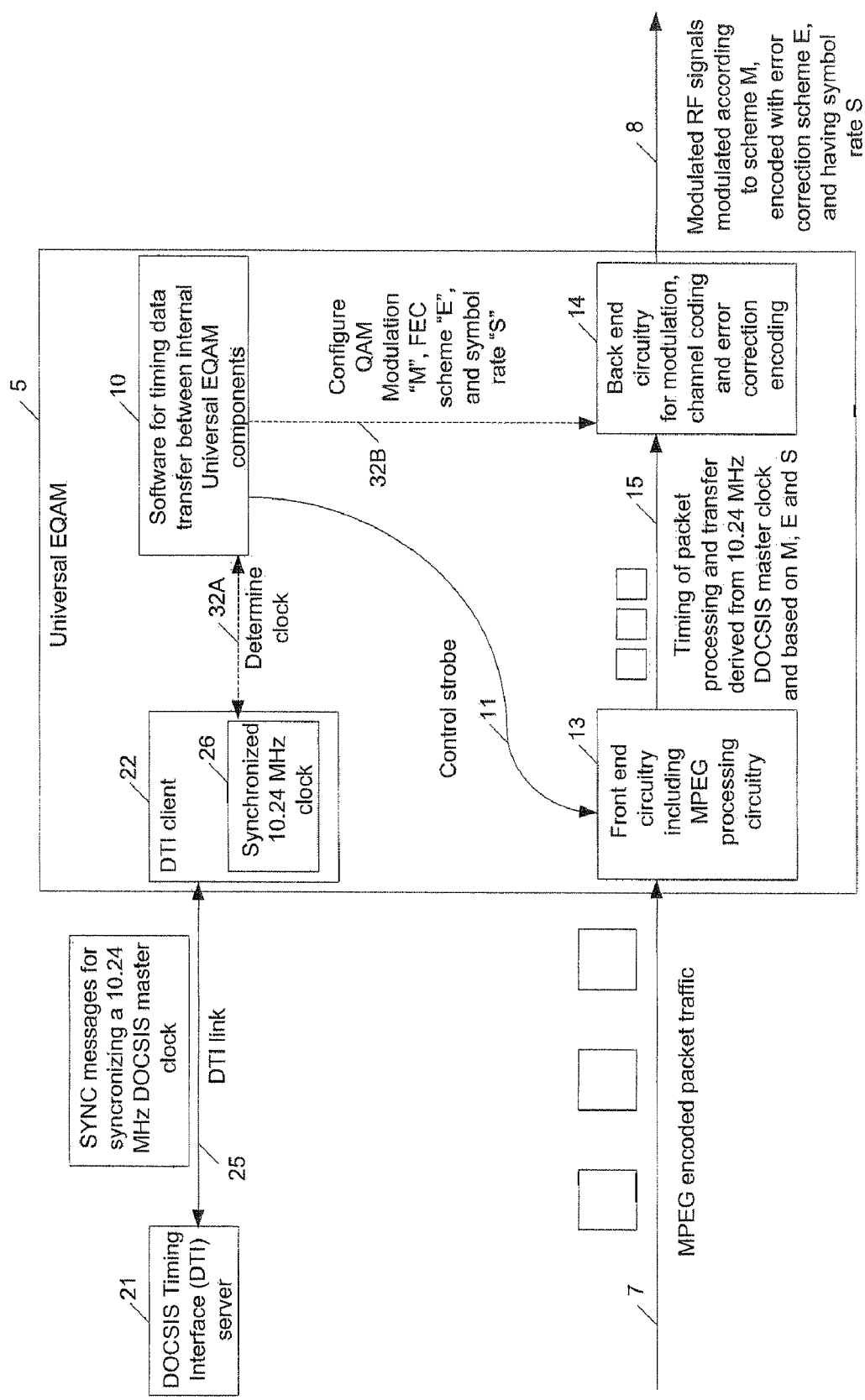
FIG. 2 illustrates one example of how the Universal EQAM shown in FIG. 1 times packet processing to regulate data transfer between components of the Universal EQAM.

FIG. 2 illustrates one example of how the Universal EQAM shown in FIG. 1 times packet processing to regulate data transfer between components of the Universal EQAM.

The software 10 obtains a reference clock as represented by dashed line 32A, which in the present example will be multiplied by a custom multiplier to obtain the control strobe signal 11. The custom multiplier is calculated based on transmission variables, which in the present example includes International Telecommunication Union Standardization Section (ITU-T) J.83 QAM Modulation/Annex Level/Symbol Rate. In the present example, the reference clock is the DOCSIS 10.24 MHz baseband clock 26, which is the same clock used by the circuitry 14 when performing ITU-T J.83 Forward Error Correction (FEC) encoding.

Multiplying the same clock signal used by the circuitry 14 by a custom multiplier value to obtain the control strobe 11 provides certain advantages. For example, even though the control strobe 11 will operate at a different frequency than the 10.24 MHz clock, the mathematical relationship between these frequencies can prevent jitter within the Universal EQAM 5. This principle can be applied to other systems besides DOCSIS networks when an output stage circuitry encodes using a clock signal.

The master clock used to synchronize the baseband clock is provided by a DOCSIS Timing Interface (DTI) server 21. The Universal EQAM 5 includes a DTI client 22 that exchanges synchronization messages over a DTI link 25 maintained with the server 21. Other network devices, such as the M-CMTS core also synchronize with the DTI server 21. Accordingly, the reference clock 26 used to obtain the control signal 11 is synchronized with other remote network devices in the cable network, which can further optimize transmission along the path extending from the circuitry 13 to the cable modems. This principle can be applied to other examples besides DOCSIS networks when a plurality of remote network devices synchronize to a same baseband clock.

In addition to obtaining the reference clock 26, the software 10 can control which ITU-T J.83 QAM Modulation/Annex Level/Symbol Rate will be used by the Universal EQAM 5 during transmission. This configuration of ITU-T J.83 QAM Modulation/Annex Level/Symbol Rate is shown in FIG. 2 as represented by arrow 32B. In the present example, such configuration includes setting the symbol rate S to six decimal places of accuracy. This symbol rate S represents the data rate for transporting both data from the payload of the MPEG packets and overhead data added by the circuitry 14 such as error correction data added during ITU-T J.83 FEC encoding. Such configuration 32B also includes selecting which modulation scheme 'M' and which error correction encoding scheme 'E' are to be used by the circuitry 14 to generate the signal 8.

Once the values S, M, and E are selected, the software uses these values to calculate a reference rate that will be used to select the custom multiplier. This custom multiplier will be multiplied by the DOCSIS clock to create a strobe signal that will produce an input transmission rate 15 that is less than the output transmission rate 8. This lower transmission rate 15 accounts for bits added according to the ITU-T J.83 forward error correction encoding scheme, as well as the QAM modulation level used by the circuitry 14, e.g. QAM 64 or QAM 256.

After a reference data rate has been calculated according to the symbol rate S, the modulation scheme M, and the error correction encoding scheme E, the software identifies a frequency for the circuitry 13 to process received MPEG packets 7. The software 10 identifies this frequency using any process, for example by dividing the calculated reference rate by a fixed packet length size of the incoming MPEG packets (188 Bytes in the present example). The software 10 selects a custom multiplier to be multiplied by the baseband clock frequency of 10.24 MHz to obtain the identified processing frequency.

Once the custom multiplier is selected, the software 10 generates the control strobe 11 by multiplying the baseband clock 26 by the selected multiplier. The resulting clock is provided as a control strobe 11 to the circuitry 13. At every interval defined by the strobe signal 11, the circuitry 13 timestamps an MPEG packet 7 before initiating timed transfer 15 of the stamped MPEG packet to the modulation circuitry 14.

Accordingly, the circuitry 13 pushes data 15 into the modulation circuitry 14 at a rate that corresponds to the rate that data is being pulled out of the Universal EQAM 5.

As a result of the above, the signal 8 output by the Universal EQAM 5 has a constant delay. In other words, the amount of time difference between the instant a first portion of data is output from the circuitry 14 and a timestamp included in that first portion will be identical to the amount of time difference between the instant any other second portion of data is output from the circuitry 14 and a timestamp included in that second portion. Thus, certain disruptions of cable modem operation can be prevented.

Although the software 10 in the present example configures the transmission variables, in other examples it may be possible for another component to configure the transmission variables. In such an example, the software 10 determines the transmission variables, and then generates a strobe by adjusting the baseband clock according to the transmission variables that were configured by a different component.

Figure 3:
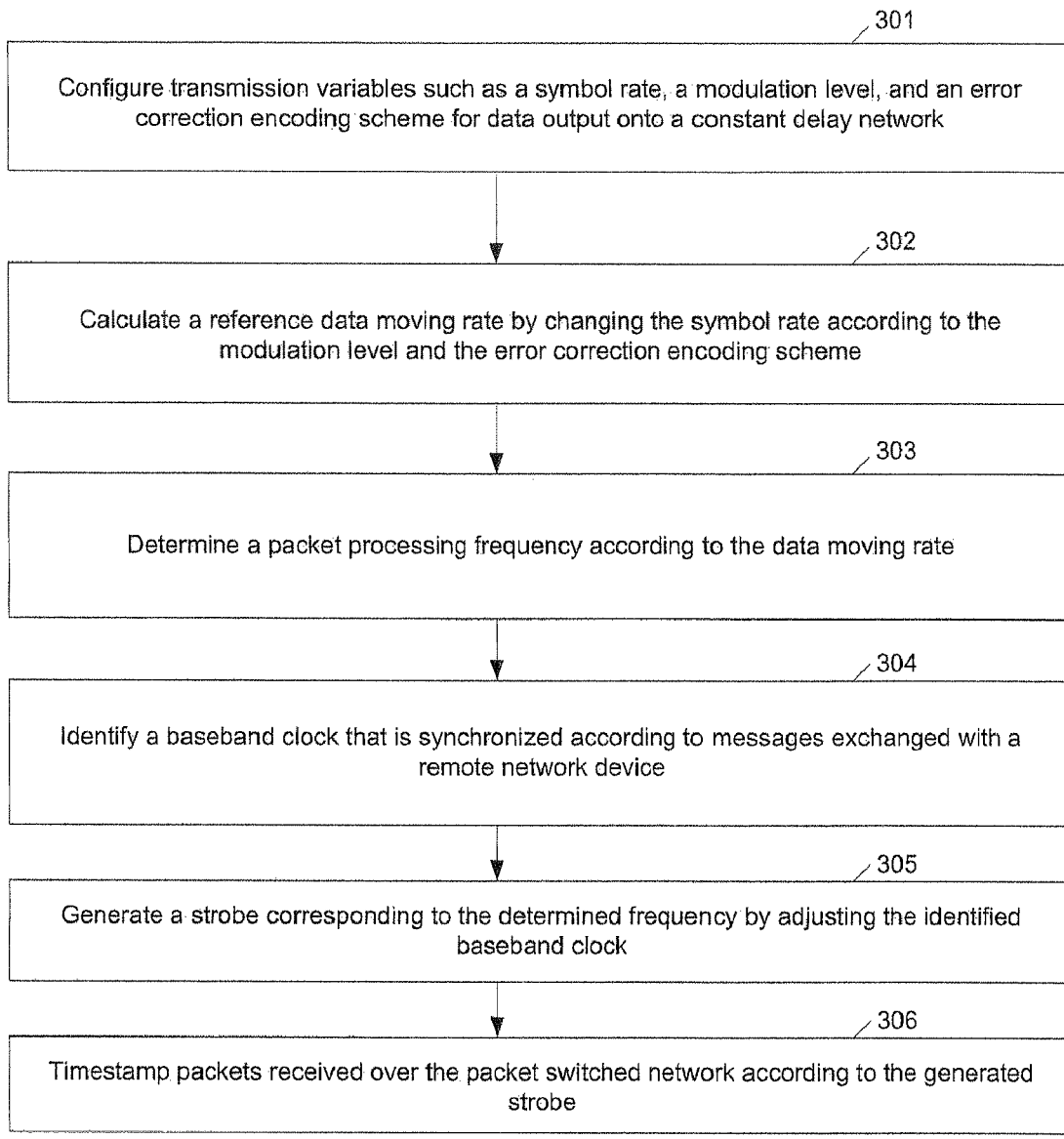
FIG. 3 illustrates an example method for using the Universal EQAM illustrated in FIGS. 1 and 2.

FIG. 3 illustrates an example method for using the Universal EQAM illustrated in FIGS. 1 and 2.

In block 301, the Universal EQAM 5 configures transmission variables such as a symbol rate, a modulation level, and an error correction encoding scheme for data output onto a constant delay network.

In block 302, the Universal EQAM 5 calculates a reference data-moving rate according to the transmission variables. In block 303, the Universal EQAM 5 determines a packet processing frequency according to the reference data-moving rate, which in the present example includes dividing the calculated data-moving rate by a fixed length packet size of packets included in the received packet switched traffic. In block 304, the Universal EQAM 5 identifies a baseband clock that is synchronized according to messages exchanged with a remote network device.

In block 305, the Universal EQAM 5 generates a strobe corresponding to the determined frequency by adjusting the identified baseband clock. In the present example this includes selecting a custom clock multiplier according to the transmission variables, and adjusting the identified baseband clock according to the selected custom multiplier. In block 306, the Universal EQAM 5 timestamps packets received over the packet switched network and pushes these timestamped packets to modulation circuitry according to the generated strobe.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus for modulating received packet switched traffic for transfer over a constant transmission delay network, the apparatus comprising:
   a front end component to insert timestamps into headers of fixed length packets received over the packet switched network;
   a back end component coupled to the front end component, the back end component to modulate data to be output onto the constant transmission delay network; and
   a controller configured to:
   identify a baseband clock that is synchronized according to synchronization messages exchanged between the apparatus and a remote network device over the packet switched network;
   generate a strobe by adjusting the identified baseband clock; and
   signal the front end component to timestamp the fixed length packets according to the generated strobe.

2. The apparatus of claim 1 wherein the controller is further configured to:
   configure a symbol rate of the output modulated data; and
   generate the strobe according to the configured symbol rate.

3. The apparatus of claim 1 wherein the controller is further configured to:
   configure a symbol rate of the output modulated data and a modulation level for the output modulated data;
   identify a reference data rate according to the configured symbol rate and modulation level; and
   calculate a frequency of the strobe according to the identified reference data rate.

4. The apparatus of claim 3 wherein the controller is further configured to:
   calculate the frequency by dividing the identified reference data rate lay a fixed length packet size of the fixed length packets;
   select a custom clock multiplier that, when multiplied by the baseband clock, produces the calculated frequency; and
   generate the strobe by multiplying the baseband clock by the selected custom clock multiplier.

5. The apparatus of claim 1 wherein the identified baseband clock is a same clock used by the backend component during a modulation process.

6. The apparatus of claim 1 wherein the back end component modulates the processed fixed length packets as they are received and without delay.

7. The apparatus of claim 1 wherein the processed fixed length packets are transferred to the back end component without using a buffer.

8. The apparatus of claim 1 wherein a first frequency of the strobe is greater than a second frequency of the identified baseband clock.

9. The apparatus of claim 1 wherein the timestamps are inserted into the fixed length packets to replace timestamps inserted by a Data Over Cable Service Interface Specification (DOCSIS) Modular Cable Modem Termination System (M-CMTS) core.

10. An apparatus, comprising:
    means for obtaining a reference clock that is synchronized according to synchronization messages exchanged between the apparatus and a remote network device over a packet switched network;
    means for generating a strobe by adjusting the reference clock;
    means for controlling local timestamping of packets received over the packet switched network according to the generated strobe;
    means for generating a modulated output signal that is based on the timestamped packets; and
    means for adjusting the reference clock according to a symbol rate associated with the modulated output signal.

11. The apparatus of claim 10 further comprising:
    means for identifying a modulation scheme and an error correction encoding scheme used to generate the modulated output signal;
    means for selecting a custom clock multiplier according to the symbol rate, the modulation scheme, and the error correction encoding scheme; and
    means for adjusting the reference clock using the selected custom clock multiplier.

12. The apparatus of claim 10 wherein the generated strobe includes a pulse at every occurrence of a fixed interval, wherein no more than one of the timestamped packets is provided to modulation circuitry during each occurrence of the fixed interval.

13. The apparatus of claim 10 wherein the timestamped packets are passed to modulation circuitry, and wherein a data rate for the timestamped packets is less than an output rate of the modulation circuitry.

14. A method, comprising:
    identifying a reference clock that is synchronized over a packet switched network;
    generating a control signal by adjusting the identified reference clock;
    controlling packet processing according to the generated control signal;
    generating a modulated output signal that is based on the processed packets; and
    adjusting the identified reference clock according to a symbol rate associated with the modulated output signal.

15. The method of claim 14 wherein the generated control signal has a first frequency that is greater than a second frequency of a clock used for generating Data Over Cable Service Interface Specification (DOCSIS) timestamps.

16. The method of claim 14 further comprising:
    identifying a modulation scheme and an error correction encoding scheme used to generate the modulated output signal;
    selecting a custom clock multiplier according to the symbol rate, the modulation scheme, and the error correction encoding scheme; and
    adjusting the identified reference clock using the selected custom clock multiplier.

17. The method of claim 14 wherein the generated control signal includes a pulse at every occurrence of a fixed interval, wherein no more than one of the processed packets is passed to modulation circuitry during each occurrence of the fixed interval.

18. The method of claim 14 wherein the processed packets are transferred to modulation circuitry, and wherein a data rate for the transferred packets corresponds to an output rate of the modulation circuitry.

19. The method of claim 14 wherein the modulated output signal is encoded according to the J.83 specification.

* * * * *

UNITED STATES PATENT AND TRADEMARK OFFICE
CERTIFICATE OF CORRECTION

PATENT NO. : 7,720,077 B1  
APPLICATION NO. : 12/125876  
DATED : May 18, 2010  
INVENTOR(S) : Healy et al.

It is certified that error appears in the above-identified patent and that said Letters Patent is hereby corrected as shown below:

At column 6, line 55, please replace "lay" with --by--.
At column 6, line 63, please replace "backend" with --back end--.

Signed and Sealed this
Twenty-sixth Day of July, 2011

David J. Kappos
*Director of the United States Patent and Trademark Office*